(12) United States Patent
Onggosanusi et al.

(10) Patent No.: US 7,302,233 B2
(45) Date of Patent: Nov. 27, 2007

(54) MULTIUSER DETECTION FOR WIRELESS COMMUNICATIONS SYSTEMS IN THE PRESENCE OF INTERFERENCE

(75) Inventors: Eko N. Onggosanusi, Allen, TX (US); Timothy M. Schmidl, Dallas, TX (US); Anand G. Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 394 days.

(21) Appl. No.: 10/732,978

(22) Filed: Dec. 11, 2003

(65) Prior Publication Data

US 2004/0259504 A1    Dec. 23, 2004

Related U.S. Application Data

(60) Provisional application No. 60/480,703, filed on Jun. 23, 2003.

(51) Int. Cl.
*H04B 17/00* (2006.01)
(52) U.S. Cl. .................. 455/67.13; 455/67.11; 455/63.1; 375/316; 375/340; 375/341; 375/346; 375/348; 375/349; 370/342; 370/441
(58) Field of Classification Search ............ 455/67.13, 455/453, 63.1, 67.11; 370/342, 441; 375/148, 375/316, 340, 144, 348, 349, 130
See application file for complete search history.

(56) References Cited

U.S. PATENT DOCUMENTS 5,818,876 A * 10/1998 Love .................... 375/341

| | | | |
|---|---|---|---|
| 6,240,099 B1 * | 5/2001 | Lim et al. .................... 370/441 |
| 6,404,760 B1 * | 6/2002 | Holtzman et al. .......... 370/342 |
| 6,426,973 B1 * | 7/2002 | Madhow et al. ............ 375/231 |
| 6,463,107 B1 * | 10/2002 | Lindoff et al. .............. 375/343 |
| 6,466,566 B1 * | 10/2002 | De Gaudenzi et al. ..... 370/342 |
| 6,483,868 B2 * | 11/2002 | Ozluturk et al. ............ 375/152 |
| 6,516,022 B2 * | 2/2003 | Ozluturk et al. ............ 375/152 |
| 6,529,495 B1 * | 3/2003 | Aazhang et al. ............ 370/342 |
| 6,587,524 B2 * | 7/2003 | Doetsch et al. ............. 375/350 |
| 6,628,701 B2 * | 9/2003 | Yellin .......................... 375/148 |
| 6,628,706 B1 * | 9/2003 | Lindoff ....................... 375/231 |

(Continued)

OTHER PUBLICATIONS

"Successive Cancellation of Adjacent Channel Signals In FDMA/TDMA Digital Mobile Radio Systems", Arsian, H., et al., Vehicular Technology Conference, 1998. VTC 98, 48th IEEE Ottawa, Ont., Canada, May 18-21, 1998, New York, NY, USA, IEEE, US, vol. 3, May 18, 1998, pp. 1720-1724, XP010288123, ISBN: 0-7803-4320-4, Sections II, III and IV.

(Continued)

*Primary Examiner*—Marceau Milord
(74) *Attorney, Agent, or Firm*—Ronald O. Neerings; Wade James Brady, III; Frederick J. Telecky, Jr.

(57) ABSTRACT

System and method for detecting transmissions from multiple users in a digital wireless communications system in the presence of interference. A preferred embodiment comprises derotating a received signal by a specified amount, determining channel estimates, which can include the determination of the number of users (interferers plus a desired user), and extracting information transmitted by the desired user from the received signal. Successive and parallel multiuser detection schemes are provided for extracting the information from the received signal.

31 Claims, 5 Drawing Sheets

U.S. PATENT DOCUMENTS

| | | | | |
|---|---|---|---|---|
| 6,700,923 | B1 * | 3/2004 | Dowling et al. | 375/148 |
| 6,856,643 | B1 * | 2/2005 | Yang et al. | 375/130 |
| 6,920,191 | B2 * | 7/2005 | Hafeez et al. | 375/346 |
| 6,934,317 | B1 * | 8/2005 | Dent | 375/140 |
| 6,967,598 | B2 * | 11/2005 | Mills | 341/50 |
| 7,221,699 | B1 * | 5/2007 | Lindskog | 375/147 |
| 7,239,650 | B2 * | 7/2007 | Rakib et al. | 370/480 |
| 7,243,064 | B2 * | 7/2007 | Paris | 704/219 |
| 7,269,236 | B2 * | 9/2007 | Kumura | 375/344 |

OTHER PUBLICATIONS

"Interference Cancelling Equalizer (ICE) for Mobile Radio Communications", Yoshino, H. et al. Communications, 1994, ICC '94, Supercomm/ICC '94, Conference Record, 'Serving Humanity Through Communications', IEEE International Conference on New Orleans, LA, USA May 1-5, 1994; New York, NY, USA, IEEE, May 1, 1994, New York, NY, USA, IEEE, May 1, 1994, pp. 1427-1432, XP01026504, ISBN: 0-7803-1825-0, Section II: Interference Canceling Equalizer (ICE).

"Co-Channel Interference Cancellation with Successive Cancellation in Narrowband TDMA Systems", Arsian, H., et al., Wireless Communications and Networking Conference, 2000. WCNC. 20000 IEEE Sep. 23-28, 2000, Piscataway, NJ, USA, IEEE, vol. 3, Sep. 23, 2000, pp. 1070-1074, XP010532692, ISBN: 0-7803-6596-8, Sections II and III.

"Radio Aspects: Interference Suppression by Joint Demodulation of Cochannel Signals", Pekka, A. Ranta, Markku Pukkila, Online, 1999, Kluwer Academic Publisher, Dordrecht, Netherlands, XP002331762, Retrieved from the Internet: URL:http://Iib.tkk.fl/diss/2003/isbn9512257179/article8.pdf> 'retrieved on Jun. 15, 2005, pp. 1-31 and particularty: Section 3.3.

"GSM Technical Specification: Digital Cellular Telecommunications System (Phase 2+); General Description of GSM Public Land Mobile Network (PLMN)," GSM 01.02, Revision 5.0.0, Mar. 1996, European Telecommunications Standards Institute, Valbonne, France.

* cited by examiner

MULTIUSER DETECTION FOR WIRELESS COMMUNICATIONS SYSTEMS IN THE PRESENCE OF INTERFERENCE

This application claims the benefit of U.S. Provisional Application No. 60/480,703, filed Jun. 23, 2003, entitled "Multiuser Detection Algorithms for GSM Systems," which application is hereby incorporated herein by reference.

CROSS-REFERENCE TO RELATED APPLICATIONS

This application is related to the following co-pending and commonly assigned patent application: Serial No. 10/738,508, filed 05/09/2003, entitled "Interferer Detection and Channel Estimation for Wireless Communication System."

TECHNICAL FIELD

The present invention relates generally to a system and method for digital wireless communications, and more particularly to a system and method for detecting transmissions from multiple users in a digital wireless communications system in the presence of interference.

BACKGROUND

Interference is a major source of concern for the designers of wireless communications networks. Interference can reduce the overall performance of the communications system and if severe enough, cause the communications system to fail altogether. Interference can come from other electrical and electronic devices operating in the general vicinity and from other devices in the same communications network that are transmitting in the same (or adjacent) frequency band.

Interference from other devices in the same communications network can become a problem as designers of the communication network attempt to increase network capacity. For example, one way to increase network capacity is to increase frequency reuse, i.e., allow devices that are relatively close to one another to transmit in the same frequency band. In cellular communications networks, adjacent cell sites typically do not operate in the same frequency bands. However, through cell site sectoring, frequency reuse can be increased, therefore increasing network capacity. Unfortunately, when devices, which are close to one another, transmit in the same frequency band or in adjacent frequency bands, interference can occur. When devices transmit within the same frequency band, co-channel interference can occur, while adjacent channel interference can occur if devices transmit in adjacent bands if sufficient interband spacing is not provided.

Additionally, when multiple users are transmitting, the infonnation may become mixed together and it may be necessary to extract one (or more) user's information from a received signal. For receivers with multiple antennas, linear schemes can be used to extract the desired information.

In a GSM (Global System for Mobile Telephony) wireless communications system, for example, information is transmitted in bursts, wherein each burst may consist of two packets of data bits with a 26 bit mid-amble in between the two bursts. According to the GSM technical standards, one of eight possible training sequence codes (TSC) can be used as the mid-amble. In GSM communications systems, attempts to increase system capacity have resulted in increased co-channel and adjacent channel interference. A majority of the prior art relies on using at least two antennas at the receiver to suppress interference. With a single antenna at the receiver, one single antenna interference cancellation (SAIC) technique is to use the joint MLSE receiver.

A disadvantage of the prior art is that the complexity of the receiver can become very high, leading to complex and expensive receivers. For example, if the conventional receiver requires a 16-state Viterbi demodulator, then a joint MLSE (which suppresses a single interferer) could require 256 states.

Another disadvantage of the prior art is that the use of linear schemes for multiuser detection can preclude the use of single antenna receivers. This can effectively eliminate a large number of receivers in use today from implementing such schemes.

SUMMARY OF THE INVENTION

These and other problems are generally solved or circumvented, and technical advantages are generally achieved, by preferred embodiments of the present invention which provides for a system and method for detecting transmissions from multiple users in the presence of interference.

In accordance with a preferred embodiment of the present invention, a method for extracting information transmitted by a desired user in a communications system from a received signal in the presence of interferers comprising derotating the received signal, determining channel estimates and detecting the presence of interferers, and extracting information transmitted by the desired user from the received signal is provided.

In accordance with another preferred embodiment of the present invention, a receiver comprising a sampling unit coupled to a signal input, the sampling unit containing circuitry to sample a received signal provided by the signal input at a specified sampling rate, a channel estimation unit coupled to the sampling unit, the channel estimation unit containing circuitry to determine a number of users present in the received signal and to compute channel estimates for each user, and a multiuser detection unit coupled to the channel estimation unit, the multiuser detection unit containing circuitry to extract information transmitted by a desired user from the received signal is provided.

An advantage of a preferred embodiment of the present invention is that it is a simple, low-complexity method that can exploit the structure of the interference from other devices in the communications network to improve the performance of receivers.

A further advantage of a preferred embodiment of the present invention is that a preferred embodiment of the present invention can be implemented upon existing receivers. This can facilitate a relatively easy implementation of the present invention on existing wireless communications networks.

Yet another advantage of a preferred embodiment of the present invention is a simple non-linear detection algorithm that can be used to facilitate the detection of multiuser information in a receiver with a single antenna. Therefore, existing single antenna receivers can implement the detection algorithm, making the implementation of the present invention simpler.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a GSM network operating in synchronous mode. The GSM technical standard can be found in a series of technical documents, wherein a general description can be found in Document 01.02, entitled "General Description of GSM Public Land Mobile Network (PLMN), Revision 6.0.0" published January 2001, which is incorporated herein by reference. The invention may also be applied, however, to other synchronous wireless communications networks which make use of known training sequences at specific locations within the transmission, such as GSM-EDGE (Enhanced Data Rates for GSM Evolution), GPRS (General Packet Radio Service), and so on.

Figure 1:
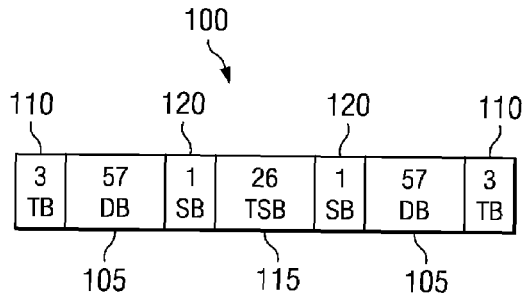
FIG. 1 is a diagram of a transmission burst in a GSM communications system.

With reference now to FIG. 1, there is shown a diagram illustrating a transmission burst 100 in a GSM communications system. Data transmitted in the burst 100 are carried in a pair of 57-bit data fields 105. Two 3-bit fields, referred to as tail bit fields 110, can be used to keep adjacent bursts separate. In many wireless communications systems, transmissions are usually preceded with a field located at the beginning of the transmission. This field is commonly referred to as a preamble and can be used to carry a specific sequence of bits (typically referred to as a training sequence) that can help a receiver detect and decode the transmission. Note that while the use of a preamble is common, it is not the only place within a transmission to place a training sequence. For example, in a GSM burst, the training sequence is located in the middle of the burst. The burst 100 contains a 26-bit training sequence field 115, which may be separated from the pair of 57-bit data fields 105 by a pair of stealing bit fields 120. Since the training sequence is not at the beginning of the transmission, it referred to as being a mid-amble. Note that the discussion of field specifics (the number of bits in a field, the position of a field, and so forth) is used to enable the discussion using a currently available wireless communications system. It should be evident that the field specifics should have no impact upon the spirit of the present invention.

Figure 2:
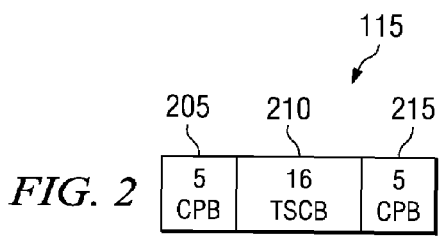
FIG. 2 is a diagram of a detailed view of a GSM 26-bit training sequence field.

With reference now to FIG. 2, there is shown a diagram illustrating a detailed view of the GSM 26-bit training sequence field 115. The GSM 26-bit training sequence field 115 can be broken up into three smaller fields, a 5-bit cyclic prefix field 205, a 16-bit training sequence field 210, and a 5-bit cyclic postfix field 215. According to the GSM technical standards, the 5-bit cyclic prefix field 205 contains a copy of the last 5 bits of the 16-bit training sequence field 210 while the 5-bit cyclic postfix field 215 contains a copy of the first 5 bits of the 16-bit training sequence field 210. According to the GSM technical specifications, there are up to eight (8) unique training sequences that may be used in a single GSM communications system.

As discussed previously, interference from other devices from within the same communications network can come in two forms, co-channel and adjacent channel interference. Regardless of the form of interference, the net result may be that the overall performance of the source of the interference and receiver of the interference may be degraded since the transmissions of both the device causing the interference and the device being interfered with are being damaged. Since the number of training sequences is limited (eight in the case of a GSM communications system), it can be possible to use the a priori knowledge of the training sequences to improve the channel estimation performance at a receiver.

Figure 3:
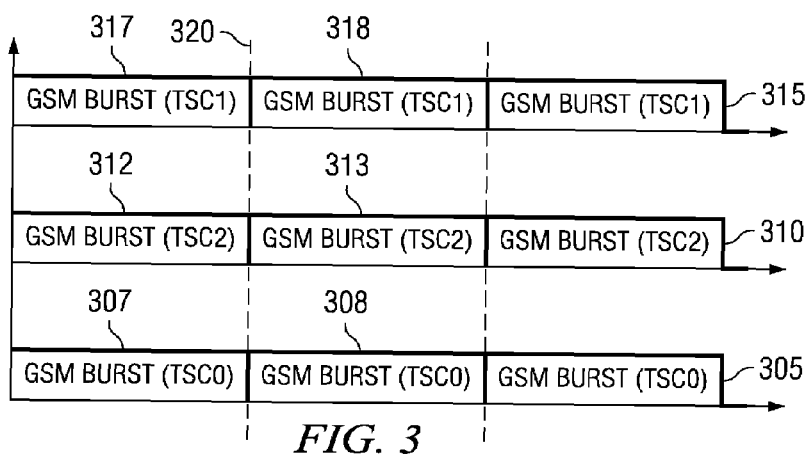
FIG. 3 is a diagram of transmissions from three GSM devices with no timing offset.

With reference now to FIG. 3, there is shown a diagram illustrating the transmissions of three GSM devices, wherein there is no timing offset. Each of three sets of axes (305, 310, and 315) display a series of GSM bursts from a single device. Note that each device uses a different training sequence; TSC0 for the transmission displayed on axis 305, TSC2 for the transmission displayed on axis 310, and TSC1 for the transmission displayed on axis 315. Note that the GSM communications system displayed in FIG. 3 is a synchronous system, wherein all of the devices transmit at essentially the same time. For example, first GSM bursts 307, 312, and 317 are all transmitted at the same time, as are second GSM bursts 308, 313, and 318. Also note that there is no (or less than a single symbol) timing offset between the transmissions of the three devices. A vertical line 320 denotes the beginning of the second GSM bursts 308, 313, and 318 in all three devices.

Note that it may be possible that a timing offset exists between the arrival times of transmissions from different devices. A timing offset may exist even if transmissions within a wireless communications system are designed to occur at the same time. For example, if a clock of a transmitter has drifted away from clocks of other transmitters, then the transmitter with the inaccurate clock can begin its transmission at an incorrect time. Alternatively, differences in the distance traveled by various transmissions (propagation delay) can also account for a timing offset. For example, even if transmissions are initiated at the same time, a transmission that is traveling a long distance will arrive later than a transmission that is traveling a short distance. A timing offset can vary from nanoseconds to milliseconds. When a timing offset is large, it can sometimes be expressed in terms of symbol intervals (an amount of time equal to the transmission of a single symbol).

For discussion purposes, a signal model, along with assumptions and notation shall be laid out. Note that the signal model presented below is for a GSM communications system. However, a comparable signal model can be provided for other types of communications systems. A baseband received signal can be sampled at a baud (symbol) rate to facilitate discrete-time processing. A Gaussian Minimum Shift Keying (GMSK) modulated signal can be accurately approximated using a linear approximation expressible as:

$$x(t) = \sum_{p=-\infty}^{\infty} j^{p+1} a_p C_0(t - pT), a_p \in \{\pm 1\},$$

wherein T is a single symbol duration and $C_0(t)$ is the GMSK waveform of duration 4T. Assuming that there are $\tilde{K}$ co-channel users in the communications system, the baseband receive signals can be expressed as:

$$\tilde{r}(t) = \sum_{k=1}^{\tilde{K}} \sum_{p=-\infty}^{\infty} j^{p+1} a_{k,p} \tilde{h}_k(t - pT) + \tilde{n}(t),$$

$$\tilde{r}_m = \tilde{r}(mT) = j^{m+1} \sum_{k=1}^{\tilde{K}} \sum_{l=0}^{L} (j^{-l} \tilde{h}_{k,l}) a_{k,m-l} + \tilde{n}_m,$$

wherein $\tilde{h}(t)$ is the overall channel impulse response including $C_0(t)$, $\tilde{h}_l = \tilde{h}(lt)$, and LT is channel delay spread. A derotation with $j^{-(m+1)}$ can be performed on the baseband received signal, resulting in a signal that can be expressed as:

$$r_m = $$

$$j^{-(m+1)} \tilde{r}_m = \sum_{k=1}^{\tilde{K}} \sum_{l=0}^{L} (j^{-l} \tilde{h}_{k,l}) a_{k,m-l} + n_m = \sum_{k=1}^{K} \sum_{l=0}^{L} h_{k,l} a_{k,m-l} + n_m.$$

Note that rather than using baud-rate sampling, oversampling (sub-baud-rate sampling) can also be performed if needed.

For discussion purposes, let "user 1" be the desired user (the user whose information is to be extracted from the received signal) and the remaining ($\tilde{K}$−1) users be interfering users. Furthermore, without loss of generality, let training sequence 1 (TSC1) be assigned to the desired user (user 1).

Figure 4:
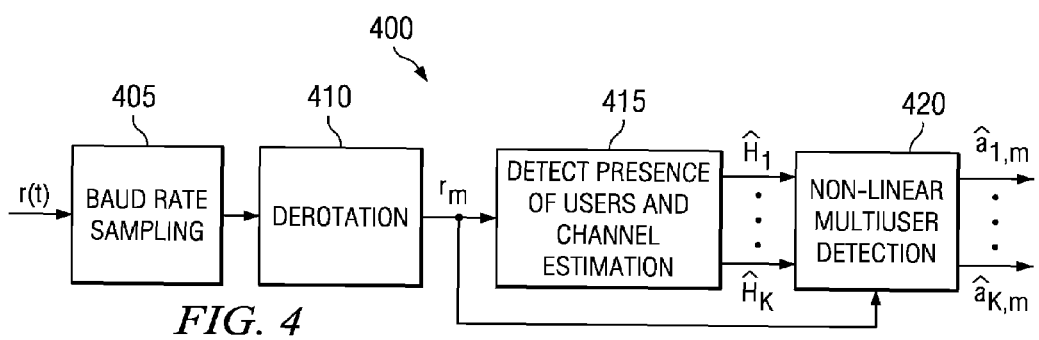
FIG. 4 is a diagram of a portion of a receiver, according to a preferred embodiment of the present invention.

With reference now to FIG. 4, there is shown a diagram illustrating a view of a portion of a receiver 400, according to a preferred embodiment of the present invention. FIG. 4 provides a high-level view of a portion responsible for interference suppression and multiuser detection in the receiver 400. Note that FIG. 4 does not show typical parts that may be found in a receiver, such as an antenna, radio frequency hardware, decoding hardware, and so forth. A received signal, r(t), as received by an antenna (not shown) of the receiver 400 and after filtering to remove out-of-band interferers and amplifying to bring signal levels to a compatible level by radio frequency hardware (also not shown), may be sampled at baud-rate (or sub-baud-rate) by a baud-rate sampling unit 405. After sampling, the sampled received signal can be provided to a derotation unit 410, wherein the samples may be derotated by a specified amount, for example, by $j^{-(m+1)}$.

After derotation, the derotated signal, $r_m$, can then be provided to a channel estimation unit 415, wherein the presence of information from users in the derotated signal can be detected and channel estimations can be computed. The channel estimates, $\hat{H}_i$, may then be provided to a non-linear multiuser detection unit 420 where the information, $\hat{a}_{i,m}$, from the users can be extracted from the derotated signal, $r_m$, and provided to portions of the receiver 400 that may be responsible for decoding, error detecting and correcting, and using the information (all are not shown). Details of the operation of the channel estimation unit 415 and the non-linear multiuser detection unit 420 will be provided below.

Figure 5:
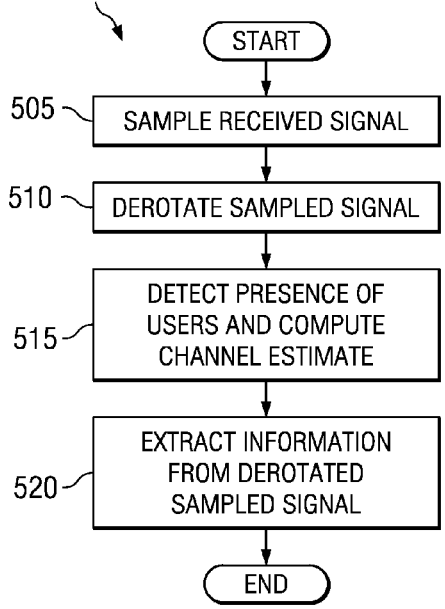
FIG. 5 is a flow diagram of a process for manipulating a signal received by a receiver and providing co-channel and adjacent channel interference and multiuser detection information and data from the received signal to circuitry and devices coupled to the receiver, according to a preferred embodiment of the present invention.

With reference now to FIG. 5, there is shown a flow diagram illustrating a process 500 for manipulating a signal received by a receiver and providing co-channel and adjacent channel interference and multiuser detection information and data from the received signal to circuitry and devices coupled to the receiver, according to a preferred embodiment of the present invention. According to a preferred embodiment of the present invention, the process 500 may execute on a controller or processor located in the receiver. According to a preferred embodiment of the present invention, the process 500 can be used in a receiver operating in a synchronous wireless communications system. If the wireless communications system is an asynchronous system, then the present invention may not operate properly. In a wireless communications system that can operate either synchronously or asynchronously (such as a GSM based system), if the wireless communications system has been detected as operating in synchronous mode, then the process 500 can be used. However, if the wireless communications system has been detected as operating in asynchronous mode, then the process 500 can be turned off. A scheme that can rapidly detect the operating mode of a wireless communications system is disclosed and discussed in the co-pending and commonly assigned patent application entitled "Interferer Detection and Channel Estimation for Wireless Communications Systems."

The processor can begin the manipulation of the received signal after it has been transmitted over-the-air and detected by an antenna. The received signal may receive analog signal processing in the form of filtering (to remove out-of-band interference, for example) and amplifying (to bring the received signal to a signal level that is compatible with circuitry in the receiver) by radio frequency (RF) circuitry located in the receiver.

Then, the received signal, r(t), can be sampled at a specified sampling rate (block 505). If the sampling rate is approximately equal to the symbol rate, then the sampling can be referred to as baud-rate sampling. If the sampling rate is higher than the symbol rate, then the sampling can be referred to as over sampling, with typical oversampling rates being two-, four-, eight-times higher than the symbol rate. After the sampling, the receive signal becomes a discrete time signal and can then be derotated (block 510). The derotation can be performed by multiplying the discrete time signal (the individual samples of the received signal) by a factor of $j^{-(m+1)}$, for example.

After the derotation, the received signal, now denoted $r_m$, can be processed in order to detect the presence of interference from transmissions made by other users within the same wireless communications system as the desired user (block 515). Along with detecting interference, a number of interferers (users) can be determined and channel estimates for the different users can be computed.

Figure 6:
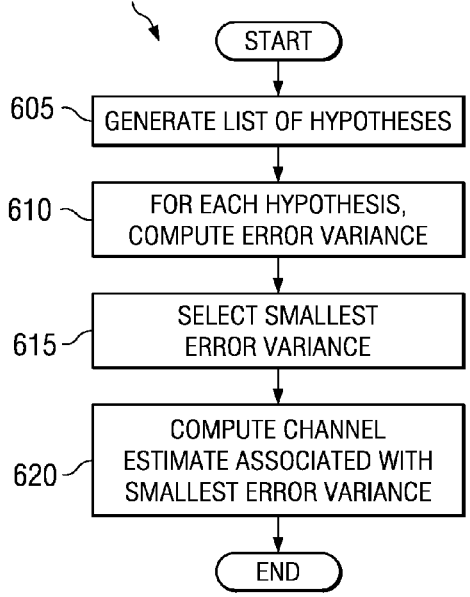
FIG. 6 is a diagram of a process for detecting interference in a received signal and computing channel estimations based upon the detected interference, according to a preferred embodiment of the present invention.

With reference now to FIG. 6, there is show a detailed view of a process 600 for detecting interference in a received signal and computing channel estimations based upon the detected interference, according to a preferred embodiment of the present invention. According to a preferred embodiment of the present invention, the process 600 can be used for the detection of interference and channel estimation based on the interference (block 515 in FIG. 5).

The process 600 can begin with the generation of a list of possible hypotheses (block 605). The list of possible hypotheses can be dependent upon the total number of possible interferers and possible timing offsets. The number of possible timing offsets may be provided by the receiver and computed from the list of non-serving carriers (detectable transmitters operating in the area). For example, in a GSM communications system, wherein there is a limit of eight (8) unique training sequences, then the total number of possible interferers is seven (7) since one of the eight training sequences is used by the desired transmission. As an example, in a case where only up to one interferer is considered with no timing offset, the list of possible hypotheses could include:

Hypothesis #1—training sequence 1 (the training sequence of the desired transmission);
Hypothesis #2—training sequence 1 and training sequence 2;
Hypothesis #3—training sequence 1 and training sequence 3;
Hypothesis #4—training sequence 1 and training sequence 4;
Hypothesis #5—training sequence 1 and training sequence 5;
Hypothesis #6—training sequence 1 and training sequence 6;
Hypothesis #7—training sequence 1 and training sequence 7; and
Hypothesis #8—training sequence 1 and training sequence 8.

Note that it would be possible to consider more than one possible interferer with the result of increasing the number of hypotheses to be considered. If timing offsets were considered, then the number of hypotheses in the above example could be equal to:

1+(the number of training sequences−1)*(the number of timing offsets), wherein the one (1) is the hypothesis for the desired transmission alone.

Then, for each hypothesis, an error variance can be computed (block 610). The process 600 may be provided with samples of the training sequences from recent bursts received by the receiver for use in the computation of the error variance. According to a preferred embodiment of the present invention, the joint least square error technique can be used to compute both the error variance and the channel estimation. The joint least squares technique is only one of several techniques that can be used. Other techniques, such as: recursive least squares (RLS) and least mean squares (LMS) can be used in place of the joint least squares technique. Additionally, iterative channel estimation in which initial channel estimates are used to make data decisions (before or after equalization) may be used. Then the data bits can be used as virtual pilot symbols to improve the channel estimation in one or more iterations. Note that iterative channel estimation can also be used in asynchronous communications systems. In yet another channel estimation technique, the entire mid-amble (all 26 bits for a GSM communications system) can be used in conjunction with the least squares channel estimation. By using more data, performance may be improved.

To use the joint least squares technique, first, a vector version of the received signal can be expressed as:

$$\underline{r} = S\underline{h} + \underline{n},$$

where $\underline{h}$ is a column vector containing the channel impulse response with L taps and $\underline{r}$ and $\underline{n}$ are both column vectors for the received signal and the noise, each containing the number of samples, M, used from the mid-amble, which for a GSM communications system is typically 16 bits. S is a circulant matrix formed from the training sequence used by the serving carrier. Let the training sequence be denoted as $\underline{s}$ (with K elements, typically 26), which contains elements that are each +1 or −1. The terms of the received signal can also be expressed as:

$$\underline{r} = \begin{bmatrix} r_0 \\ r_1 \\ \vdots \\ r_{M-1} \end{bmatrix} \quad \underline{h} = \begin{bmatrix} h_0 \\ h_1 \\ \vdots \\ h_{L-1} \end{bmatrix} \quad \underline{n} = \begin{bmatrix} n_0 \\ n_1 \\ \vdots \\ n_{M-1} \end{bmatrix} \quad \underline{s} = \begin{bmatrix} s_0 \\ s_1 \\ \vdots \\ s_{K-1} \end{bmatrix}$$

Let the number of guard bits in the training sequence be P, which for a GSM communications system is typically 5 bits. The matrix S can then be expressed as:

$$S = \begin{bmatrix} s_P & s_{P-1} & \cdots & s_{P-L+1} \\ s_{P+1} & s_P & \cdots & s_{P-L+2} \\ \vdots & \vdots & & \vdots \\ s_{P+M-1} & s_{P+M-2} & \cdots & s_{P+M-L} \end{bmatrix}.$$

Thus, if L=3, M=16, and P=5, then S is a 16×3 sized matrix. The least squares estimate of $\underline{h}$ can be expressed as:

$$\underline{\hat{h}} = (S^H S)^{-1} S^H \underline{r},$$

where $(.)^H$ denotes the Hermitian matrix operation.

The joint least squares channel estimates from the sum of two signals with different training signals is found by concatenating the $\underline{h}$ vectors and S matrices as shown below. Let $\underline{h}_1$ be the channel for the first signal and $\underline{h}_2$ be the channel for the second signal and $S_1$ and $S_2$ be the circulant matrices corresponding to the training sequences of the two signals.

$$\underline{h}_J = \begin{bmatrix} h_1 \\ h_2 \end{bmatrix} \text{ and } S_J = [\, S_1 \ \ S_2 \,].$$

The joint least squares estimate of $\underline{h}_J$ can then be expressed as:

$$\underline{\hat{h}}_J = (S_J^H S_J)^{-1} S_J^H \underline{r}.$$

Note that for a single signal with 16 samples used from the mid-amble and with a channel length of less than or equal to 6, the least squares channel estimate can simplify to:

$$\underline{\hat{h}} = S^H \underline{r}/16$$

for the eight training sequences used in a GSM communications system (due to the structure of the training sequences). Thus for a single signal, a correlation can be used to estimate the channel.

The sum of the squared errors for a single signal can be expressed as:

$$E = \left\| (I - S(S^H S)^{-1} S^H) \underline{r} \right\|^2,$$

where I is the identity matrix. Similarly, for joint least squares channel estimates, the sum of the squared error can be expressed as:

$$E = \left\| (I - S_J (S_J^H S_J)^{-1} S_J^H) \underline{r} \right\|^2.$$

Alternatively, the receiver may make use of the channel estimates to reconstruct the samples from the M samples of the mid-amble and then subtract from the originally received mid-amble to compute the sum of the squared errors.

The computed error variances for each of the hypothesis can be compared and then a channel estimate for the hypothesis corresponding to the lowest computed error variance can be used (block 615). For example, if the computed error variance for Hypothesis #5 was found to be the lowest, then the receiver knows that in addition to its desired transmitted signal, a transmission using training sequence 5 is also present. This information can then be used to compute channel estimates (block 620).

With reference back to FIG. 5, with the interferers detected (a total of K users, with one user being the desired user and K−1 interferers) and corresponding channel estimates for the K users, the process 500 can now extract information from the received signal (block 520). In a GSM communications system, a receiver has a single antenna. Therefore, a non-linear multiuser detection scheme may be needed. According to a preferred embodiment of the present invention, a successive (serial) multiuser detection scheme and a parallel multiuser detection scheme can be used to extract information from the received signal.

Figure 7A:
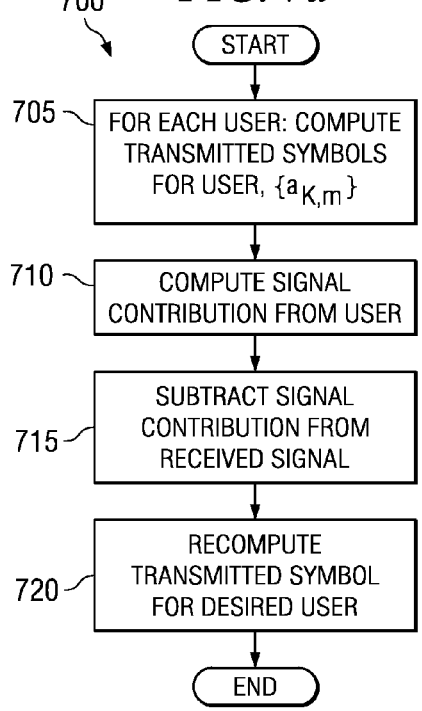
FIGS. 7a and 7b are diagrams of multiuser detection schemes, according to a preferred embodiment of the present invention.

With reference now to FIG. 7a, there is shown a diagram illustrating a process 700 for successive multiuser detection of a received signal, according to a preferred embodiment of the present invention. The process 700 can begin by computing transmitted symbols that can be attributable to a user k, $\{a_{k,m}\}$ (block 705). Note that the user may be the user transmitting the desired signal or one of the interferers. Then, the contribution to the received signal corresponding to the user k, $(h_k * a_k)_m$, can be constructed (block 710). The contribution to the received signal corresponding to user k can then be subtracted from the received signal itself (block 715). These operations (blocks 705, 710, and 715) can be repeated for each of the K users. After computing the contribution to the received signal corresponding to the user k and subtracting it from the received signal for each of the K users, the contributions from all of the interfering users may have been subtracted from the received signal and the information corresponding to the user transmitting the desired signal can be re-estimated (block 720).

Figure 8:
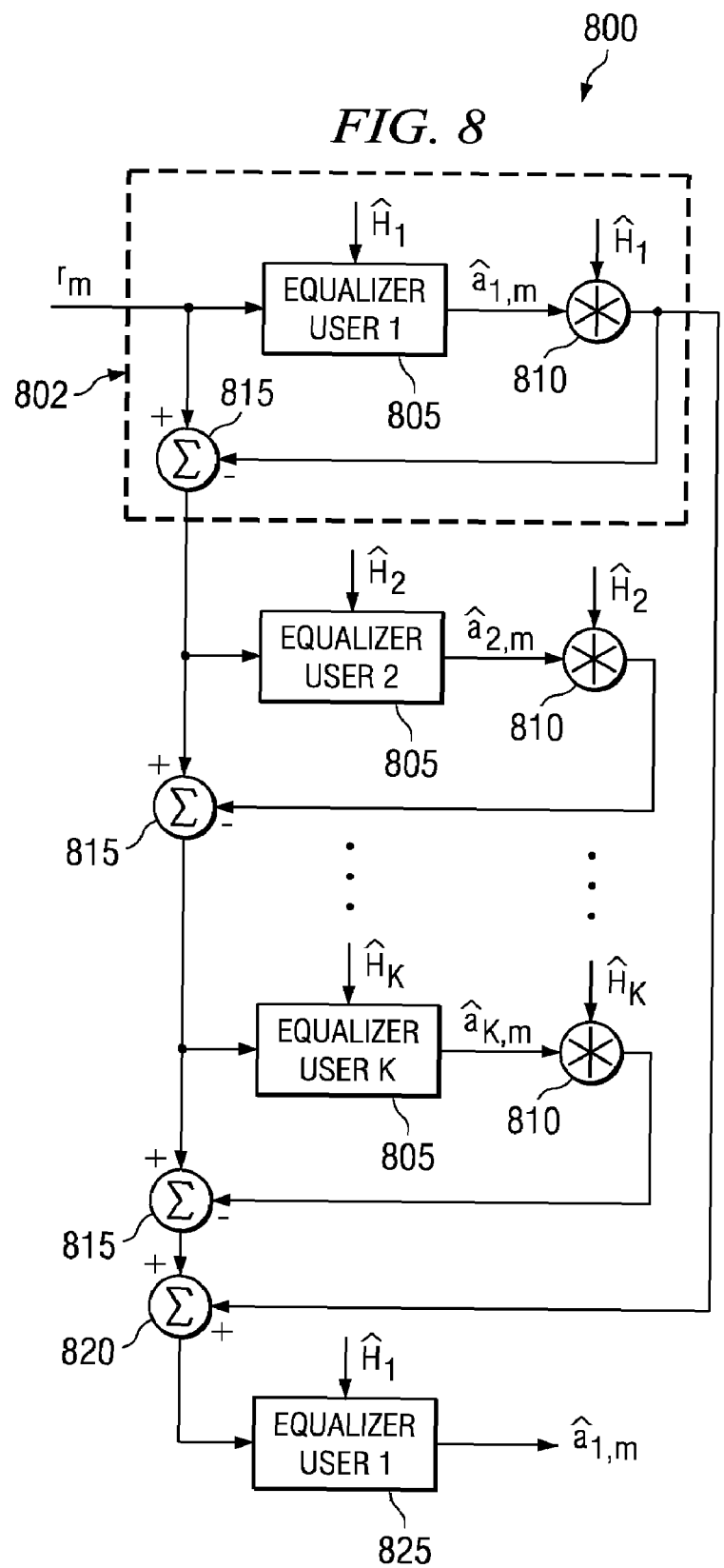
FIG. 8 is a diagram of a successive multiuser detection circuit, according to a preferred embodiment of the present invention.

With reference now to FIG. 8, there is shown a diagram illustrating a successive multiuser detection circuit 800, according to a preferred embodiment of the present invention. According to a preferred embodiment of the present invention, the successive multiuser detection circuit 800 can be constructed from multiple iterations of a structure 802 that can be used to compute the transmitted symbols for a user k, $\{a_{k,m}\}$, the contribution of the transmitted symbols for user k to the received signal, $(h_k * a_k)_m$ and subtracting the contribution of the transmitted symbols for user k from the received signal. An equalizer 805 can be used to compute the transmitted symbols for a user k, $\{a_{k,m}\}$. As input, the equalizer 805 can have the received signal minus the contribution of the transmitted symbols from users 1 to k−1. Note that if k is equal to 1, then the input to the equalizer 805 is the received signal. The equalizer 805 can also have as a second input, the channel estimate for user k (block 620 of FIG. 6). Note that the equalizer 805 can be any arbitrary single-user equalizer such as a maximum likelihood sequence estimator (MLSE) trellis-based equalizer or one of many different types of decision-feedback equalizers. The symbol estimates provided by the equalizers can be soft, hard, or something in between. Hence, some type of single-input single-output soft or hard limiter/slicer or non-linear decision device may implicitly be a part of the equalizer 805. Note that FIG. 8 depicts a single pass of successive interference cancellation. In some cases, additional performance gains can be obtained by repeating the K or K+1 iterations multiple times. For example, to obtain a better estimate of the transmitted symbols from the desired user, the K or K+1 iterations can be repeated.

To compute the contribution of the transmitted symbols for user k to the received signal, $(h_k * a_k)_m$, a convolution unit 810 can be used to convolve the output of the equalizer 805 with the channel estimate for user k. The output of the convolution unit 810 can be the contribution of the transmitted symbols for user k to the received signal and can be subtracted from the received signal by summing point 815. According to a preferred embodiment of the present invention, there can be as many copies of the structure 802 in the successive multiuser detection circuit 800 as there are expected number of users. For example, in a GSM communications system, where there is a limit of eight (8) users, then the successive multiuser detection circuit 800 may have eight such structures 802.

Output from the K-th structure 802, which is the received signal minus the contributions of the transmitted symbols from users 1 to k, can then be summed with contribution of the transmitted symbol from user 1 (without loss of generality, it was assumed that user 1 was the user transmitting the desired information) by a summing point 820. Output of the summing point 820 can be provided to a final equalizer 825 that can be used to re-estimate the transmitted symbols from user 1. Note that the final equalizer 825 may also have as input, the channel estimate for user 1.

Note that the successive multiuser detection circuit 800 does not use any particular detection ordering (it simply performs its operation in sequential order). Some performance improvement can be obtained by using some sort of detection ordering. For example, an ordering based on channel energy, $\{\|h_k\|^2\}$. Alternatively, ordering based upon signal to interference ratio (SIR) or signal to interference plus noise ratio (SINR) can also be used. If detection ordering is used, a total of K iterations may be needed if the desired user is detected last.

Figure 7B:
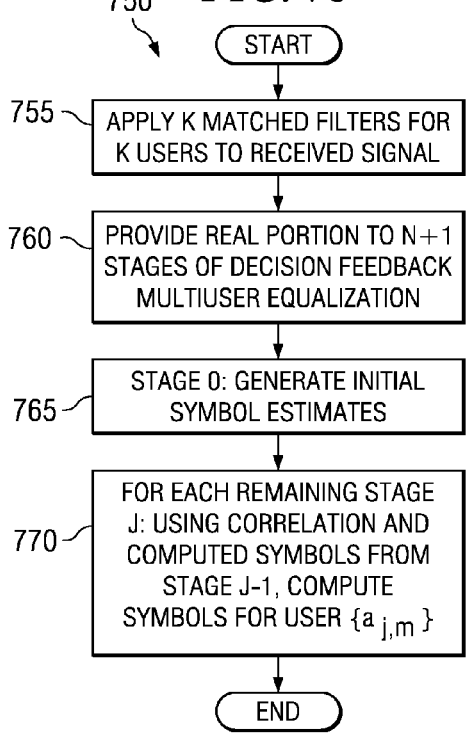

With reference now to FIG. 7b, there is shown a diagram illustrating a process 750 for parallel multiuser detection of a received signal, according to a preferred embodiment of the present invention. The process 750 can begin by applying a set of K matched filters (corresponding to the K users) to the received signal, $r_m$, resulting in $\{y_{k,m}\}$ (block 755). Note that since the underlying modulation format of $\{a_{k,m}\}$ is real valued, only the real portion of the outputs of the matched filters is needed (block 760). Then, in an initial stage (stage 0), the process 750 can generate initial symbol estimates for $\{a_{k,m}\}$ (block 765). Then, for N successive stages, the symbol estimates for one of the remaining users can be computed symbol estimates from the previous stage and correlations which can be computed from channel estimates (block 770).

The correlation can be computed from the channel estimates using the following relation:

$$R_{k,k'}(\delta) = \frac{\sum_{l=0}^{L} Re\{h_{k,l} h_{k',l-\delta}^*\}}{\sum_{l=0}^{L} |h_{k,l}|^2}, k, k' = 1, 2, \ldots, K$$

Note that $R_{k,k}(0)=1$. Since $R_{k,k'}(\delta)=R_{k',k}(\delta)$, only $K(K+1)/2$ correlation function need to be computed. Let $y=[Y_{l,m} \ldots y^{K,m}]^T$ and $\hat{a}_m^{(n)}=[\hat{a}_{l,m}^{(n)} \ldots \hat{a}_{k,m}^{(n)}]^T$, where (n) indicates an n-th stage. Assuming the presence of K users, it can be shown that:

$$y_{k,m} = \sum_{k'=1}^{K} \sum_{l=-L}^{L} R_{k,k'}(l) a_{k',m-l} + i_{k,m}$$

$$y_m = \sum_{l=-L}^{L} R(l) a_{m-l} + i_m$$

$$= R(0) a_m + \sum_{l=-L, l \neq 0}^{L} R(l) a_{m-l} + i_m$$

-continued $$R(l) = \begin{bmatrix} R_{1,1}(l) & R_{1,2}(l) & \cdots & R_{1,K}(l) \\ R_{2,1}(l) & R_{2,2}(l) & \cdots & R_{2,K}(l) \\ \vdots & \vdots & \ddots & \vdots \\ R_{K,1}(l) & R_{K,2}(l) & \cdots & R_{K,K}(l) \end{bmatrix}$$

wherein $i_m$ is composed of noise and residual interference that is not modeled above. The second term above ($y_m$) can basically be the total multiuser interference (MUI). Note that the first term above ($y_{k,m}$) can be present due to the non-zero off-diagonal components in R(0).

For the N successive stages, a decision feedback multiuser equalizer (not shown) can be used to compute the symbols estimates. A stage-n multiuser equalizer can perform a forward-backward intersymbol interference (ISI) cancellation based upon the previous symbol estimates (for each m):

$$z_m^{(n)} = y_m - W^{(n)} \times \sum_{l=-L, l \neq 0}^{L} R(l) \hat{a}_{m-l}^{(n-1)}$$

$$\hat{a}_m^{(n)} = \Im^{(n)} \{Z_m^{(n)}\}$$

wherein $W^{(n)}$ is a weighting matrix for stage-n. Note that the choice of $W^{(n)}$ can be arbitrary. For example, the weighting matrix can be chosen so that $W^{(n)}=w^{(n)}I$ with $w^{(n)} \in [0,1]$ increasing with n (that is, $w^{(n)}$ increases as the previous symbol estimates $\hat{a}_{m-1}^{(n-1)}$ becomes more reliable). The operator $\Im^{(n)}\{.\}$ can be a K-input K-output non-linear decision device. This decision device can generate fully hard (+/-1) or soft estimates. For example, it can be a classical linear clipped slicer. A preferred implementation of the decision device can be a conditional expectation estimator, expressible as:

$$\hat{a} = \Im^{(n)}\{z\} = \frac{\sum_{i=1}^{2^K} v_i \times \exp\left(-\frac{1}{2}(z - R(0)v_i)^T C_{(n)}^{-1}(z - R(0)v_i)\right)}{\sum_{i=1}^{2^K} \exp\left(-\frac{1}{2}(z - R(0)v_i)^T C_{(n)}^{-1}(z - R(0)v_i)\right)}$$

wherein $C_{(n)}$ is a covariance matrix of the residual interference plus the noise at stage-n and $\{v_1, v_2, \ldots, v_{2^K}\} \in \{-1, +1\}^K$ is a signal constellation. In general, the covariance modeled as an arbitrary non-negative definite symmetric matrix. However, results of experimentation have shown that the off-diagonal terms of the matrix (the cross correlation terms) tend to be small. Therefore, in practice, it can be sufficient that the covariance matrix be diagonal: $C_{(n)} = \text{diag}\{\sigma_1^{2(n)}, \sigma_2^{2(n)}, \ldots, \sigma_K^{2(n)}\}$. In this case, $\{\sigma_k^{2(n)}\}$ can serve as threshold parameters, which can be fixed or computed adaptively (based upon the received signal). Note that $\sigma_1^{2(n)}$ decreases with n as symbol estimates become more reliable at the latter stages.

The generation of the initial symbol estimates $\hat{a}_m^{(0)}$ (stage 0 (block 765 (FIG. 7b))) can be performed by a decision feedback equalizer with its symbol inputs set to zero. Therefore, $\hat{a}_m^{(0)} = \Im^{(0)}\{y_m\}$. Alternatively, the output of the match filters, $\{y_{k,m}\}$, (block 755 (FIG. 7b)) can be applied to a 1-input 1-output decision device (such as described above with K=1) on each stream. This can be expressed as:

$$\hat{a}_{k,m}^{(0)} = \frac{\exp\left(-\frac{(y_{k,m}-1)^2}{2\sigma_k^{2(0)}}\right) - \exp\left(-\frac{(y_{k,m}+1)^2}{2\sigma_k^{2(0)}}\right)}{\exp\left(-\frac{(y_{k,m}-1)^2}{2\sigma_k^{2(0)}}\right) + \exp\left(-\frac{(y_{k,m}+1)^2}{2\sigma_k^{2(0)}}\right)} = \tanh\left(\frac{y_{k,m}}{\sigma_k^{2(0)}}\right),$$

$$k = 1, 2, \cdots, K.$$

The variance parameters, $\sigma_k^{2(n)}$, can be computed adaptively from the mid-amble data which carries the training sequence symbols. The computation can be updated every transmission burst. It is desired that the detection process for the mid-amble data and estimate the variance parameters at every stage by subtracting the contribution from the known training sequence symbols from the input to $\Im^{(n)}\{.\}$. In particular, for the initial stage (stage 0), $$\sigma_k^{2(0)} = \langle (y_{k,m} - TSC_{k,m})^2 \rangle$$

wherein $\langle . \rangle$ indicates an averaging operation over m within the mid-amble. For stage-n, where n=1, 2, . . . , N:

$$\sigma_k^{2(n)} = \left\langle \left(z_{k,m}^{(n)} - \sum_{k'=1}^{K} R_{k,k'}(0) \times TSC_{k',m}\right)^2 \right\rangle.$$

Figure 9:
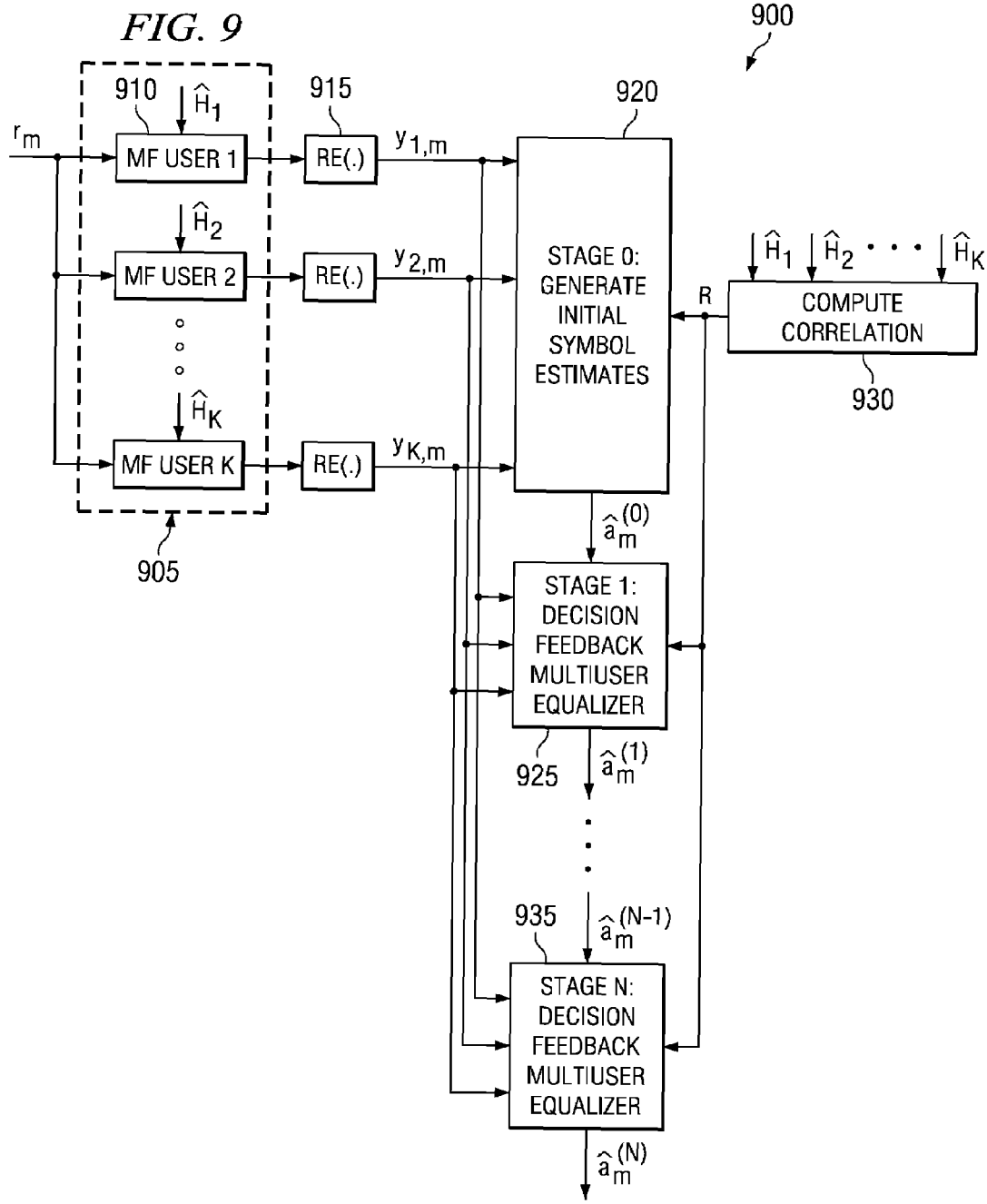
FIG. 9 is a diagram of a parallel multiuser detection circuit, according to a preferred embodiment of the present invention.

With reference now to FIG. 9, there is shown a diagram illustrating a parallel multiuser detection circuit 900, according to a preferred embodiment of the present invention. According to a preferred embodiment of the present invention, the parallel multiuser detection circuit 900 includes a matched filter bank 905, wherein there may be a matched filter 910 for each expected user in a received signal. For example, in a GSM communications system, there is a limit of eight (8) unique training sequences, which leads to a limit of eight expected users. In other communications systems, there can be a different limit on the number of unique training sequences and therefore, a parallel multiuser detection circuit used in these communications systems can have a different number of matched filters 910. Each matched filter 910 can have two inputs, with a first input being the received signal, $r_m$, and a second input being a channel estimate for user k, with the resulting output being signal $\{y_{k,m}\}$.

As discussed previously, due to the underlying nature of the modulation format of $\{a_{k,m}\}$ being real valued, only the real portion of the signal $\{y_{k,m}\}$ is needed. The extraction of the real portion of the signal $\{y_{k,m}\}$ can be accomplished by a real-valued circuit 915. Note that outputs from each of the matched filters 910 can be provided to a separate real-valued circuit 915. Outputs from the real-valued circuits 915 can then be provided to (N+1) decision feedback multiuser equalizers. A first decision feedback multiuser equalizer (stage 0) 920 may be used to compute the initial estimates of $\{a_{k,m}\}$ ($\hat{a}_m^{(0)}$ from the outputs of the real-valued circuits 915.

Output from the first decision feedback multiuser equalizer 920 ($\hat{a}_m^{(0)}$) can then be provided to a second decision feedback multiuser equalizer 925. In general, output from a stage-n decision feedback multiuser equalizer can become input to a stage-(n+1) decision feedback multiuser equalizer.

The first decision feedback multiuser equalizer 920 (and subsequent decision feedback multiuser equalizers) may also receive as input a correlation, R, that can be computed from channel estimates. The correlation, R, may be computed from the channel estimates by a compute correlation circuit 930 and may be expressed as:

$$R(l) = \begin{bmatrix} R_{1,1}(l) & R_{1,2}(l) & \cdots & R_{1,K}(l) \\ R_{2,1}(l) & R_{2,2}(l) & \cdots & R_{2,K}(l) \\ \vdots & \vdots & \ddots & \vdots \\ R_{K,1}(l) & R_{K,2}(l) & \cdots & R_{K,K}(l) \end{bmatrix}.$$

A detailed description of the correlation can be found above. The output of a (N+1) decision feedback multiuser equalizer 935 can be the desired information, $\hat{a}_m^{(N)}$, transmitted by the desired user.

With reference back to FIG. 5, after the desired information that was transmitted by the desired user has been extracted from the received signal (block 520), the process 500 can continue to process addition information as further transmission bursts are received. If no further transmission bursts are received, the receiver may be placed in a sleep mode to save energy.

Figure 10:
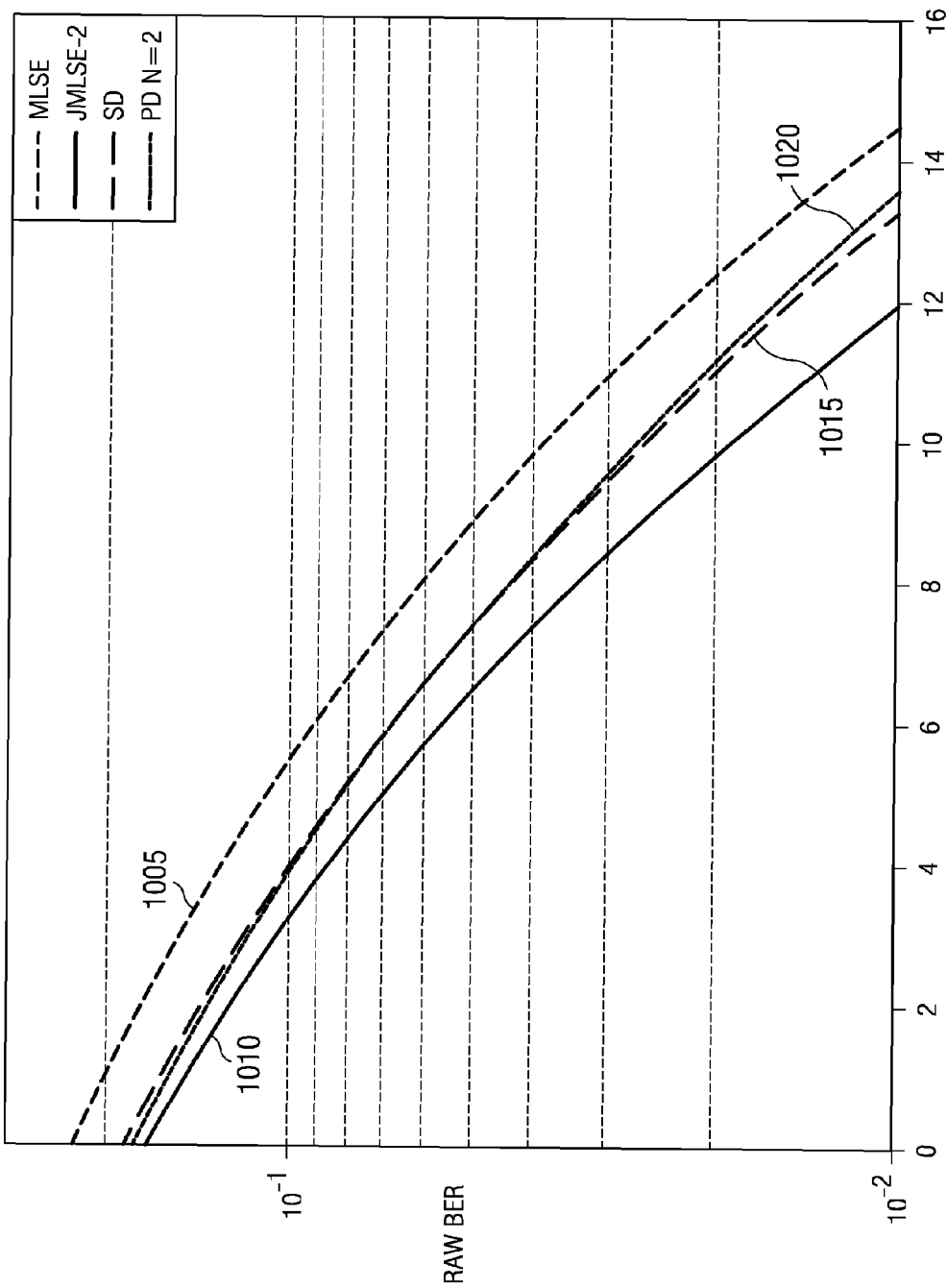
FIG. 10 is a diagram of a comparison of bit-error rate versus carrier-to-interference ratio for several multiuser detection schemes, according to a preferred embodiment of the present invention.

With reference now to FIG. 10, there is shown a diagram illustrating a comparison of bit-error rate (BER) versus carrier-to-interference ratio (CIR) for several multiuser detection schemes, according to a preferred embodiment of the present invention. A series of curves display the BER performance of four different multiuser detection schemes, with a first curve 1005 representing the performance of a receiver using conventional minimum least square error scheme, a second curve 1010 representing the performance of a receiver using a joint minimum least square error scheme, a third curve 1015 representing the performance of a receiver using successive multiuser detection scheme, and a fourth curve 1020 representing the performance of a receiver using parallel multiuser detection scheme. The results show that the successive multiuser detection scheme (the third curve 1015) and the parallel multiuser detection scheme (the fourth curve 1020) perform nearly as well as the joint minimum least square error scheme (the second curve 1010) and measurably better than the conventional minimum least square error scheme (the first curve 1005), with gains of more than 1 dB.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for extracting information transmitted by a desired user in a communications system from a received signal in the presence of interferers comprising:
   sampling a received signal at a specified sampling rate;
   determining a number of users present in the received signal and channel estimates for each user;
   extracting information transmitted by the desired user from the received signal; and
   applying a rotation of a specified amount to the sampled received signal.

2. The method of claim 1, wherein the received signal is transmitted at a symbol rate, and wherein the sampling rate is essentially equal to the symbol rate.

3. The method of claim 1, wherein the received signal is transmitted at a symbol rate, and wherein the sampling rate is higher than the symbol rate.

4. A method for extracting information transmitted by a desired user in a communications system from a received signal in the presence of interferers comprising:
   derotating the received signal:
   determining channel estimates and detecting the presence of interferers, wherein the determining comprises:
      generating a list of hypotheses;
      computing an error variance for each hypothesis in the list of hypotheses;
      selecting a hypothesis associated with a smallest computed error variance;
      computing channel estimates from the selected hypothesis; and
   extracting information transmitted by the desired user from the received signal.

5. The method of claim 4, wherein a hypothesis contains information about a desired user and any expected interferers.

6. The method of claim 5, wherein a hypothesis further contains timing offset information.

7. A method for extracting information transmitted by a desired user in a communications system from a received signal in the presence of interferers comprising:
   derotating the received signal;
   determining channel estimates and detecting the presence of interferers;
   extracting information transmitted by the desired user from the received signal; and
   wherein the determining provides a number of users transmitting in the communications system, wherein the number of users provided by the determining includes the desired user, and wherein the extracting comprises:
   for each user,
      computing transmitted symbols;
      computing contribution of the transmitted symbols from the user;
      removing the computed contribution from the received signal; and
   the method further comprising,
      recomputing the transmitted symbols from the desired user.

8. The method of claim 7, wherein the first computing comprises applying a channel estimate for the user to the received signal.

9. The method of claim 8, wherein an equalizer is used to apply the channel estimate to the received signal.

10. The method of claim 7, wherein the second computing comprises multiplying the computed transmitted symbols with a channel estimate for the user.

11. The method of claim 7, wherein the desired user is a first user whose computed contribution is subtracted from the received signal, and wherein the recomputing comprises:
   combining a received signal with the computed contribution from the first user removed with a received signal with the computed contributions from each user removed; and
   applying a channel estimate for the first user to the combined received signal.

12. The method of claim 11, wherein the applying is performed by an equalizer.

13. The method of claim 7, wherein ordering of the users is performed.

14. The method of claim 13, wherein the ordering is based on a numbering of the users.

15. The method of claim 13, wherein the ordering is based on the users' channel energy.

16. The method of claim 13, wherein the ordering is based on SIR.

17. The method of claim 13, wherein the ordering is based on SINR.

18. The method of claim 7, wherein the extracting can be repeated for the same set of transmitted symbols.

19. A method for extracting information transmitted by a desired user in a communications system from a received signal in the presence of interferers comprising:
   derotating the received signal;
   determining channel estimates and detecting the presence of interferers;
   extracting information transmitted by the desired user from the received signal; and
   wherein the determining provides a number of users transmitting in the communications system, and wherein the extracting comprises:
   applying the received signal to a plurality of matched filters, wherein there is one matched filter per number of users;
   providing outputs from the plurality of matched filters to a first decision feedback multiuser equalizer to compute an initial estimate of the information;
   providing outputs from the plurality of matched filters to a sequentially connected series of N decision feedback multiuser equalizers, wherein each decision feedback multiuser equalizer computes an intermediate estimate of the information based on an output of a previous decision feedback multiuser equalizer and a correlation;
   wherein N is an integer number representing a number of estimates of the information desired, and wherein output of the N-th decision feedback multiuser equalizer is the information.

20. The method of claim 19, wherein the number of matched filters is equal to a maximum number of unique users in the communications system.

21. The method of claim 19, further comprising extracting a real component of the outputs from the plurality of matched filters.

22. A receiver comprising:
   a sampling unit coupled to a signal input, the sampling unit containing circuitry to sample a received signal provided by the signal input at a specified sampling rate;
   a channel estimation unit coupled to the sampling unit, the channel estimation unit containing circuitry to determine a number of users present in the received signal and to compute channel estimates for each user;

a multiuser detection unit coupled to the channel estimation unit, the multiuser detection unit containing circuitry to extract information transmitted by a desired user from the received signal; and a derotation unit having an input coupled to the sampling unit and an output coupled to the channel estimation unit and the multiuser detection unit, the derotation unit containing circuitry to apply a rotation of a specified amount to the sampled received signal.

23. The receiver of claim 22, wherein the multiuser detection unit can extract the information transmitted by the desired user in a single iteration, and wherein to improve upon the quality of the extracted information, the multiuser detection unit can repeatedly iterate on the received signal.

24. The receiver of claim 23, wherein the multiuser detection unit repeatedly iterates on the same received signal.

25. The receiver of claim 22 further comprising a derotation unit having an input coupled to the sampling unit and an output coupled to the channel estimation unit and the multiuser detection unit, the derotation unit containing circuitry to apply a rotation of a specified amount to the sampled received signal.

26. The receiver of claim 22, wherein the receiver is part of a wireless device used in a synchronous communications system.

27. The receiver of claim 26, wherein the synchronous communications system is a GSM compliant communications system.

28. A receiver comprising:
a sampling unit coupled to a signal input, the sampling unit containing circuitry to sample a received signal provided by the signal input at a specified sampling rate;

a channel estimation unit coupled to the sampling unit, the channel estimation unit containing circuitry to determine a number of users present in the received signal and to compute channel estimates for each user;

a multiuser detection unit coupled to the channel estimation unit, the multiuser detection unit containing circuitry to extract information transmitted by a desired user from the received signal, the multiuser detection unit comprising:

a plurality of transmit symbol compute units coupled in a sequential fashion to a channel estimation unit, each symbol compute unit comprising, an equalizer containing circuitry to apply a channel estimate to an input signal to compute transmitted symbols for a user, wherein the input signal is the derotated sampled received signal if the transmit symbol compute unit is the first of the plurality, else the input signal is an output of a previous transmit symbol compute unit;

a convolution unit coupled to the equalizer, the convolution unit to convolve an output of the equalizer with the channel estimate; and a summing point coupled to the input signal and the multiplier, the summing point to subtract an output of the convolution unit from the input signal;

a final summing point coupled to an output of a final transmit symbol compute unit from the plurality and an output of the convolution unit from the first transmit symbol compute unit, the final summing point to add the two signals; and a final equalizer coupled to the final summing point, the final equalizer to re-estimate the information transmitted by the desired user.

29. The receiver of claim 28, wherein there are as many transmit symbol compute units as there are unique users.

30. A receiver comprising:
a sampling unit coupled to a signal input, the sampling unit containing circuitry to sample a received signal provided by the signal input at a specified sampling rate;

a channel estimation unit coupled to the sampling unit, the channel estimation unit containing circuitry to determine a number of users present in the received signal and to compute channel estimates for each user;

a multiuser detection unit coupled to the channel estimation unit, the multiuser detection unit containing circuitry to extract information transmitted by a desired user from the received signal, the multiuser detection unit comprising:

a plurality of matched filters coupled to a signal input line, each matched filter to apply a channel estimate for a unique user to a signal provided by the signal input line;

a first decision feedback multiuser equalizer coupled to outputs of the plurality of matched filters, the first decision feedback multiuser equalizer containing circuitry to compute an initial estimate of the information transmitted by the desired user;

a correlation unit coupled to the first decision feedback multiuser equalizer, the correlation unit containing circuitry to compute a correlation function based on channel estimates; and a plurality of decision feedback multiuser equalizers serially coupled together, wherein a first of the plurality is coupled to the first decision feedback multiuser equalizer, each decision feedback multiuser equalizer coupled to the outputs of the plurality of matched filters and the correlation unit, each decision feedback multiuser equalizer containing circuitry to compute an intermediate estimate of the information transmitted by the desired user based upon the correlation function, the outputs of the plurality of matched filters, and an output of a previous decision feedback multiuser equalizer.

31. The receiver of claim 30, wherein there are N decision feedback multiuser equalizers in the plurality, wherein N is an integer number representing a number of estimates to be performed, and wherein output of the N-th decision feedback multiuser equalizer is the information transmitted by the desired user.

* * * * *